Patented May 31, 1949

2,471,866

UNITED STATES PATENT OFFICE 2,471,866

RECLAIMING SYNTHETIC OLEFIN-POLY-OLEFIN-RUBBERY POLYMERS

Lawrence T. Eby, Roselle, N. J., assignor to Standard Oil Development Company, a corporation of Delaware No Drawing. Application December 15, 1945, Serial No. 635,403

14 Claims. (Cl. 260—79)

This invention relates to low temperature interpolymers of isobutylene with a polyolefin; relates particularly to the recovery of used polymers; and relates especially to the reclaim of cured polymer by the application thereto of tertiary aliphatic mercaptans, at elevated temperatures.

One of the more important substitutes for rubber is the low temperature interpolymer of isobutylene with a multiolefin prepared at temperatures ranging from about −40° C. to −164° C. by the application to the mixed olefins of a dissolved Friedel-Crafts catalyst as is shown in detail in U. S. Patents Nos. 2,356,127 and 2,356,128, issued August 22, 1944. This polymer cures readily with sulfur, especially in the presence of a sulfurization aid such as tetramethyl thiuram disulfide or the like, to yield bodies having tensile strengths ranging from 500 lbs. to 4500 lbs. per square inch, with elongation at break ranging from 250% to 1200%. Many attempts have been made to reclaim this polymer from worn structures such as tires and inner tubes, and various methods have been proposed which are effective for the purpose, but they are all undesirably slow, or wasteful of power or otherwise unsatisfactory.

According to the present invention, the polymer is "devulcanized," or uncured, or returned to its original raw condition, by a treatment with tertiary aliphatic mercaptans at elevated temperatures; substantially any of the tertiary aliphatic mercaptans being usable. These mercaptan substances are readily prepared by reaction between hydrogen sulfide and an olefin. The process results in an excellent devulcanization of the polymer to yield a material which can be recompounded and recured into a good highgrade polymer article.

The tertiary mercaptans suitable for the practicing of this invention are readily prepared by combination between an olefin and hydrogen sulfide. Both of these materials being relatively cheap, and the process easy, the resulting mercaptans are available in quantity at very low cost. Accordingly, the process of the present invention has a very substantial economic advantage as compared to the devulvanizing processes which have been known for natural rubber, which require much more expensive devulcanizing aids such as, for example, thiophenols, as set out for natural rubber (caoutchouc) in Patents No. 2,193,624 and 2,333,810. Also, the tertiary aliphatic mercaptans are, in general, substantially less toxic and less odoriferous than most of the devulcanizing agents which have been suggested for natural rubber. The resulting reduction in unpleasant odor in the process, coupled with the reduction in cost, makes the process of great importance in the industrial application of the devulcanizing process of the present invention.

Thus, the invention applies to cured isobutylene-diolefin polymer, a tertiary aliphatic mercaptan, at elevated temperatures to devulcanize the polymer and prepare it for recompounding and recuring. Other objects and details of the invention will be apparent from the following description.

The raw material of the present invention is a low-temperature interpolymer of an isoolefin with a poly-olefin, all of the lower isoolefins and polyolefins being broadly useful. The preferred isoolefin is isobutylene, but under certain circumstances such substances as 2-methyl pentene-1 or 2-methyl hexene-1 or 2-methyl heptene-1 and the like, up to about 15 carbon atoms, are similarly usable. The poly-olefinic material may be any of the multiolefins having from 4 to 12 or 14 carbon atoms, multi-olefins within this range being the preferred components. Of these, butadiene, isoprene, piperylene, dimethyl butadiene, cyclo pentadiene, dimethallyl and myrcene are particularly useful. The olefins are mixed together in the ratio of a major proportion of the isoolefin and a minor proportion of the multiolefin, the preferred range of proportions being from 70 parts to 99.5 parts of the isoolefin with from 30 parts to 0.5 part by weight of the polyolefin.

The mixed olefins are preferably cooled to a temperature ranging from −40° C. to −165° C. This may be accomplished by the use of a refrigerating jacket upon the reactor or on a storage tank for the mixed olefins, or may be accomplished by the use of an internal refrigerant. For this purpose such substances as liquid butane, liquid or solid carbon dioxide, liquid ethane, liquid ethylene or even liquid methane are suitable.

The polymerization is conducted by the application to the cold mixed olefinic material of a Friedel-Crafts catalyst selected from the list given by N. O. Calloway in his article on "The Friedel-Crafts Synthesis" printed in the issue of "Chemical Reviews" published for the American Chemical Society at Baltimore in 1935 in volume XVII, No. 3, the article beginning on page 327, the list being particularly well shown on page 375.

These catalysts are desirably all used in solution in a low-freezing, non-complex-forming solvent, although gaseous boron trifluoride and liquid titanium tetrachloride may, in some instances, be used as such, rather than in solution. The catalyst solvent preferably is one which has a solubility for aluminum chloride of at least 0.3 to 1%, and a freezing point below 0° C., thereby being low freezing. It also should be characterized by the property of boiling away completely from the Friedel-Crafts active metal halide catalyst substance with a minor change in boiling points, less than 1 or 2° over the boiling point of the pure solvent, thereby being non-complex-forming.

For the catalyst solvent, any carbonaceous compound which is free from oxygen and is liquid at temperatures below 0° C. may be used, depending upon the solubility of the catalyst compound in the selected solvent. With aluminum chloride, the preferred solvents are ethyl or methyl chloride or carbon disulfide. With boron trifluoride, the preferred solvents are ethyl or methyl chloride or carbon disulfide or liquid butane, liquid propane, liquid ethylene, or the like. Aluminum bromide is conveniently usable with hydrocarbon solvents such as liquid propane, liquid ethane, liquid butane, liquid pentane, liquid hexane and the like. Also double salts or complexes of aluminum chloride and aluminum bromide are soluble in these hydrocarbons and are particularly useful.

The polymerization is conveniently conducted by spraying the liquid catalyst or catalyst solution through a nebulizer or spraying nozzle onto the surface of the rapidly stirred cold olefinic material. The reaction, especially with the more active catalysts, proceeds promptly to yield the desired polymer.

The polymer preferably has a molecular weight, as determined by the Staudinger method, or a Staudinger number, of from 30,000 to about 85,000, the best range being from 40,000 to about 60,000. The polymer likewise preferably has an iodine number ranging from about ½ to about 50, the preferred range being between about 1 and 20. The polymer is a white, more or less transparent or translucent material with considerable plasticity and cold flow.

The material is reactive in a curing reaction with sulfur, especially in the presence of a sulfurization aid such as "Tuads" (tetramethyl thiuram disulfide). It is also reactive with such substances as paraquinone dioxime, especially in the presence of an inorganic oxidizing agent such as $Pb_3O_4$. The polymer is similarly reactive with the dinitroso compounds, either meta or para. A convenient recipe for compounding the polymer is:

| | Parts |
|---|---|
| Polymer | 100 |
| Zinc oxide | 0.5 to 10 |
| Stearic acid | 0.5 to 7 |
| Carbon black | 10 to 200 |
| Sulfur | 0.5 to 4 |
| Tuads | 1 to 4 |

The Tuads and sulfur may be replaced by paraquinone dioxime or other dioxime substances in the proportion of approximately 2 to 4 parts, or by a dinitroso compound in the proportion of from 1 to 4 or 5 parts; or mixtures of the various substances may be used.

The compound is conveniently prepared on the roll mill, and the completed compound may be placed in molds and cured at temperatures ranging from 125° C. to 180° C. for time intervals ranging from a few minutes to 5 or 6 hours, depending upon the nature and amount of the curing component.

The resulting cured polymer will show a tensile strength within the range between 500 lbs. and 4500 lbs. per square inch, with an elongation at break ranging from 250% to 1200%, and a modulus of elasticity (pounds pull to produce an elongation of 300%) ranging from 50 to 1500. The polymer also shows a high resistance to oxidation by air and ozone, shows a very high abrasion resistance, a very high flexure resistance and other very valuable physical properties which make it a superior replacement for natural rubber.

However, it is frequently desirable to refabricate the polymer, especially when it has been made into automobile tires or analogous substances and the structure worn out.

According to the present invention, the polymer reclaimed is "devulcanized" by a treatment at elevated temperatures in the presence of a tertiary aliphatic mercaptan.

The tertiary aliphatic mercaptan of the invention is identified by the type formula:

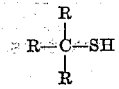

in which R may be similar or dissimilar alkyl, aryl, alkaryl or aralkyl groups which may in turn contain substituents such as hydroxyl, halogen, keto, cyano, aldehyde, sulfo, nitro, amino, ester, carboxyl, amido, ether, thio, etc. groups. Suitable aliphatic mercaptans are:

Tertiary-butyl mercaptan
Tertiary-amyl mercaptan
Tertiary-hexyl mercaptan
Tertiary-octyl mercaptan
Tertiary-decyl mercaptan
Tertiary-dodecyl mercaptan
2,4,4-trimethylpentane-2-thiol
Alpha-tertiary-octyl ethyl mercaptan
9-mercapto-1-octadecanol
2-methylheptane-2-thiol
2,5-dimethyl-2-hexene-5-thiol
3-mercapto-1,3-dimethylbutanol
1-methylcyclohexane-1-thiol
1-2-dimethylcyclohexane-1-thiol
1-chloro-3-mercapto-3-methylbutane
1-chloro-2-mercapto-2-methylbutane
2,4-dimethylhexane-2-thiol
3,5-dimethylhexane-3-thiol
2,2,4,6,6-pentamethylheptane-4-thiol
2,4,4,6,6-pentamethylheptane-2-thiol
2-methylpentane-2-thiol
2-methylbutane-2-thiol
3-methyl-1-butene-3-thiol
2,3-methyl-3-mercapto-1-butanol
2,3-dimethyl-1-butene-3-thiol
4-methyl-1-pentene-4-thiol
4-methyl-2-pentene-4-thiol
Triphenylmethyl mercaptan
1,1-diphenylethanethiol
2-phenylpropane-2-thiol
Tri-p-chlorophenylmethyl mercaptan
2-benzylpropane-2-thiol
2,6-dimethyl-4,6-octadiene-2-thiol
3,7-dimethyl-4,6-octadiene-3-thiol
1-methyl-1-(methylcyclohexyl) ethanthiol
3-methyl-1-butene-3-thiol
Mercaptoalkylsuccinic anhydride
Mercaptoalkylsuccinic acid
Alpha-mercapto alpha-methyl propionic acid
Ethyl ester of alpha-mercapto alphamethyl propionic acid
1-methyl-1-cyanoethanethiol
1-methyl-1-(aminomethyl) ethanethiol These mercaptans are readily prepared by the interaction between the appropriate olefin and hydrogen sulfide, or other known methods. That is, any of the convenient olefins may be treated with hydrogen sulfide and the proper catalyst to yield the desired mercaptan. Such olefins as isobutylene, tertiary amylene, tertiary hexylene, tertiary heptylene, tertiary octylene, tertiary decylene, tertiary dodecylene, tertiary hexadecylene, tertiary octadecylene, diisobutylene, triisobutylene, tetraisobutylene and the like, may be mixed with hydrogen sulfide in the presence of a catalyst to produce the desired tertiary alphatic mercaptans. Catalysts such as those disclosed in applications Serial No. 512,776 and 512,777, both filed December 15, 1945, and both now abandoned, may be used. Other methods of preparation of tertiary alphatic mercaptans may be used if desired.

The cured polymer may be treated with these mercaptans in any desired manner. Preferably, the polymer is shredded into as small portions as possible, and treated with from 0.1 to 5.0 parts of the mercaptan per 100 of shredded polymer, and the mixture warmed to a temperature ranging from 50° C. to 300° C., preferably from 100° C. to 200° C., for a time interval ranging from one-quarter to several hours. After the heat treatment, the polymer may be milled briefly to yield the desired plastic polymer which may thereafter be compounded with further portions of sulfur or other curing agent, and if desired, further portions of fillers and processing aids to yield a new product which is suitable for recuring into a material of good strength and excellent physical properties.

The mercaptan can be used in an inert organic solvent, such as kerosene, benzene, naphtha, etc. A 10% to 50% solution of tertiary octyl mercaptan in varsol is a preferred composition. The mercaptan solution is mixed with the rubber to be reclaimed with or without the aid of an auxiliary agent, such as sodium hydroxide, potassium hydroxide, quaternary ammonium hydroxide, etc. The auxiliary agents help to remove the fibers from the mixture which may be mechanically held to the rubber. Acids, such as sulfuric acid, may also be used to remove the fibers. The mercaptan-rubber mixture, with or without an auxiliary agent, may be heated in open steam to cause the devulcanization process to take place.

The invention is not limited to the mercaptans per se, but various metal salts of the mercaptans may be used, the metal salts replacing part or all of the mercaptans themselves. Any of the metals may be used for this purpose, including such metals as sodium, potassium and the like, or calcium, strontium and the like, or the iron group and copper group metals and the like. This list is intended to be representative of all of the elements which are identified as "metals." It may be noted that the metal salts of the mercaptans hydrolize somewhat readily to the mercaptan per se and a metal oxide or other metal salt, depending on the presence of an auxiliary substance in the rubber or elsewhere. Under these circumstances, both the free mercaptan and the metal salt may be active in the devulcanization. The preferred metals are the alkali metal group, together with copper, zinc, cadmium, tin, iron, nickel and even silver, but as above pointed out, any metal may be used to combine with the mercaptan for this devulcanizing operation.

Alternatively, the entire operation may be conducted on the roll mill; the reclaim either in original pieces or after shredding and the removal of as much fabric as possible, is milled briefly; and the mercaptan added to it during the milling. As the milling proceeds, especially if the roll temperature is relatively high, the polymer softens quite rapidly and in a very few minutes it "bands" smoothly without "lacing" and is in condition for further compounding, molding, extruding and curing to yield a new structure from polymer reclaim.

EXAMPLE I

A sample of polymer known to have been compounded according to the following Recipe I and cured was reclaimed for further use.

RECIPE I

*Compounding of copolymer*

| Components | Parts by Weight |
|---|---|
| GR-I (isobytylene-isoprene copolymer) | 100 |
| SRF Black (Semi-Reinforcing Furnace Black) | 30 |
| EPC Black (Easy Processing Channel Black) | 20 |
| Petrolatum | 3 |
| Paraffin | 1 |
| Zinc Oxide | 5 |
| Tuads (tetramethyl thiuram disulfide) | 1 |
| Captax (mercaptobenzothiazol) | 0.5 |
| Sulfur | 2 |

After compounding and curing for 45 and 60 minutes at 142° C., the tensile strength, elongation, modulus and Shore hardness were known to be as follows:

TABLE I

*Press cure data of Recipe I*

```
                       Tensile-elongation
                       Mod. @ 200%-Shore
                           (Inst., 30 sec.)
45' @ 142° C. _____ 2160-765
                                225-50, 44
60' @ 142° C. _____ 2035-730
                                220-51, 44
```

This polymer was shredded into particles small enough to pass through a five mesh screen and then treated at approximately 170° C. (100 lbs. steam) with diisobutyl mercaptan in medium naphtha and triisobutyl mercaptan in medium naphtha, as shown in the following Recipe II: (Recipe III being a comparison test)

RECIPES II AND III

*Devulcanization of polymer with tert-alkyl mercaptans*

| Components | Parts by Weight | |
|---|---|---|
| | II | III |
| Polymer (Ground 5 mesh) | 100 | 100 |
| Diisobutyl Mercaptan-Varsol #1 (10-90) | 10 | |
| Triisobutyl Mercaptan-Varsol #1 (10-90) | | 10 |

The open steam pan treatment was used on the ground polymer after thorough mixing with the mercaptan-naphtha mixture. After this treatment, the devulcanized polymer was "stuck up" on the mill with five passes at 20 gauge and refined at 5 gauge. Both compounds stuck up quite readily to yield a material of satisfactory consistency. The respective samples were then compounded according to Recipe IV (and V) as follows:

RECIPES IV AND V

*Compounding of devulcanized copolymer*

| Components | Parts by Weight | |
| --- | --- | --- |
| | Recipe IV | Recipe V |
| Devulcanized Polymer—Recipe II | 100 | |
| Devulcanized Polymer—Recipe III | | 100 |
| Forum 40 (naphthenic type oil) | 5 | 5 |
| Zinc Oxide | 5 | 5 |
| Tuads (tetra-methyl thiuram disulfide) | 1 | 1 |
| Captax (mercaptobenzothiazole) | 0.5 | 0.5 |
| Sulfur | 2 | 2 |

This compound was prepared on the open roll mill in the usual manner, the reclaimed polymer being put on the mill first, and milled until it was well banded, which was easily obtained; and then the various compounding ingredients were added.

The resulting compounds were then cured in the press and evaluated for tensile strength; elongation at break, modulus at 200% elongation; and Shore hardness; two samples of each compound being cured respectively 60 minutes and 90 minutes at 142° C. These data are shown in Table II.

TABLE II

*Press cure data of Recipes IV and V*

| | Tensile-Elongation Mod. @ 200%—Shore (Inst., 30 sec.) | |
| --- | --- | --- |
| | Recipe IV | Recipe V |
| 60′ @ 142° C | 865-725 100-32, 19 | 705-705 100-30, 19 |
| 90′ @ 142° C | 895-710 100-36, 20 | 780-725 100-32, 20 |

These results show the utility of the reclaimed method, although the tensile strengths are somewhat low.

EXAMPLE II

The reclaim is particularly advantageous as a diluent for raw polymer, in which it greatly improves the milling and compounding operations without injury to the physical properties of the polymer.

The base stock was prepared according to the following recipe:

RECIPE VI

*Copolymer base stock*

| Components | Parts by Weight |
| --- | --- |
| Polymer | 100 |
| SRF Black (Semi Reinforcing Furnace Black) | 30 |
| EPC Black (Easy Processing Channel Black) | 20 |
| Forum 40 (naphthenic type oil) | 5 |
| Petrolatum | 3 |
| Paraffin | 1 |
| Zinc Oxide | 5 |
| Tuads (tetramethyl thiuram disulfide) | 1 |
| Captax (mercaptobenzothiazole) | 0.5 |
| Sulfur | 2 |

The base stock was press cured and evaluated alone, and 25 parts of the compounded refined product from the open steam pan were added to 100 parts of the base stock, as shown in Recipes VI, VII and VIII:

RECIPES VI, VII AND VIII

*Compounding of polymer and reclaim*

| Components | Parts by Weight | | |
| --- | --- | --- | --- |
| | Recipe VI | Recipe VII | Recipe VIII |
| Base Stock | 100 | 100 | 100 |
| Compounded Reclaim—Recipe IV | | 25 | |
| Compounded Reclaim—Recipe V | | | 25 |

Press cures were made on these compounds and tested for tensile strength, elongation at break, modulus at 200% elongation and Shore hardness to yield the following inspection record in Table III:

TABLE III

*Press cure data of Recipes VI, VII and VIII*

| | Tensile-Elongation Mod. @ 200%—Shore (Inst., 30 sec.) | | |
| --- | --- | --- | --- |
| | Recipe VI | Recipe VII | Recipe VIII |
| 45′ @ 142° C | 2155-755 415-46, 38 | 2070-815 370-45, 35 | 2110-810 380-43, 34 |
| 60′ @ 142° C | 2230-745 510-50, 41 | 2165-805 390-48, 38 | 2025-750 420-48, 39 |
| 90′ @ 142° C | 2105-680 585-52, 42 | 2090-740 475-50, 42 | 2096-740 510-50, 41 |

These results show the excellent quality of fresh polymer containing reclaim and emphasize the very great advantage to be obtained in milling, extruding, calendering, and the like of the polymer reclaim.

Thus the process of the invention treats a cured polymer material with a mercaptan to devulcanize the material and prepare it for re-use including recompounding, remolding and recuring, either alone or in combination with fresh polymer.

While there are above disclosed but a limited number of embodiments of the process and apparatus of the invention, it is possible to produce still other embodiments without departing from the inventive concept herein disclosed and it is therefore desired that only such limitations be imposed on the appended claims as are stated therein or required by the prior art.

The invention claimed is:

1. The process for reclaiming a synthetic rubber polymer prepared by catalytically copolymerizing isobutylene and a polyolefin having from 4 to 10 carbon atoms per molecule at a polymerizing temperature within the range between −40° C. and −164° C. and which polymer is thereafter cured by reaction with sulfur, comprising the steps in combination of heating the cured polymer to a temperature within the range of 100° C. to 200° C. in the presence of a tertiary aliphatic mercaptan.

2. The process for reclaiming a synthetic rubbery polymer prepared by catalytically copolymerizing isobutylene and a polyolefin having from 4 to 10 carbon atoms per molecule at a polymerizing temperature within the range between −40° C. and −164° C. and which polymer is thereafter cured by reaction with sulfur, comprising the steps in combination of heating the cured polymer to a temperature within the range of 100° C. to 200° C. in the presence of a tertiary aliphatic mercaptan, and thereafter milling the polymer to plasticity to produce a polymer which is suitable for recuring with sulfur.

3. The process for reclaiming a polymer prepared by catalytically copolymerizing isobutylene and a polyolefin having from 4 to 10 carbon atoms per molecule at a polymerizing temperature within the range between —40° C. and —164° C. which is thereafter cured by reaction with sulfur, comprising the steps in combination of heating the cured polymer to a temperature within the range of 100° C. to 200° C. in the presence of a tertiary aliphatic mercaptan, milling the polymer to plasticity and compounding it with a further portion of sulfur.

4. The process for reclaiming a polymer prepared by catalytically copolymerizing isobutylene and a polyolefin having from 4 to 10 carbon atoms per molecule at a polymerizing temperature within the range between —40° C. and —164° C. which polymer is thereafter cured by reaction with sulfur, comprising the steps in combination of heating the cured polymer to a temperature within the range of 100° C. to 200° C. in the presence of a tertiary aliphatic mercaptan, compounding the milled polymer with a further portion of sulfur and thereafter heating the recompounded polymer to curing temperature.

5. The process for reclaiming a sulfur-cured rubbery isoolefin-diolefin interpolymer produced at a temperature below —40° C. comprising the steps of heating the polymer to a temperature within the range of 100° C. and 200° C. in the presence of a tertiary aliphatic mercaptan comprising tertiary octyl mercaptan.

6. The process for reclaiming a sulfur-cured rubbery isoolefin-diolefin interpolymer produced at a temperature below —40° C. comprising the steps of heating the polymer to a temperature within the range of 100° C. and 200° C. in the presence of a tertiary aliphatic mercaptan comprising tertiary decyl mercaptan.

7. The process for reclaiming a sulfur-cured rubbery isoolefin-diolefin interpolymer produced at a temperature below —40° C. comprising the steps of heating the polymer to a temperature within the range of 100° C. and 200° C. in the presence of a tertiary aliphatic mercaptan comprising tertiary dodecyl mercaptan.

8. The process for reclaiming a polymer prepared by polymerizing isobutylene and a polyolefin having from 4 to 10 carbon atoms per molecule at a polymerizing temperature within the range between —40° C. and —164° C. and which polymer is thereafter cured by reaction with sulfur, comprising the steps in combination of heating the cured polymer to a temperature within the range of 100° C. to 200° C. in the presence of a tertiary aliphatic mercaptan comprising tertiary octyl mercaptan, compounding the milled polymer with a further portion of sulfur and thereafter heating the recompounded polymer to curing temperature.

9. The process for reclaiming a polymer prepared by polymerizing isobutylene and a polyolefin having from 4 to 10 carbon atoms per molecule at a polymerizing temperature within the range between —40° C. and —164° C. and which polymer is thereafter cured by reaction with sulfur, comprising the steps in combination of heating the cured polymer to a temperature within the range of 100° C. to 200° C. in the presence of a tertiary aliphatic mercaptan comprising tertiary decyl mercaptan, compounding the milled polymer with a further portion of sulfur and thereafter heating the recompounded polymer to curing temperature.

10. The process for reclaiming a polymer prepared by catalytically polymerizing isobutylene and a polyolefin having from 4 to 10 carbon atoms per molecule at a polymerizing temperature within the range between —40° C. and —164° C. and which polymer is thereafter cured by reaction with sulfur, comprising the steps in combination of heating the cured polymer to a temperature within the range of 100° C. to 200° C. in the presence of a tertiary aliphatic mercaptan comprising tertiary dodecyl mercaptan, compounding the milled polymer with a further portion of sulfur and thereafter heating the recompounded polymer to curing temperature.

11. The process for reclaiming a polymer prepared by catalytically polymerizing isobutylene and isoprene at a polymerizing temperature within the range between —40° C. and —164° C. by the application thereto of a Friedel-Crafts catalyst in solution in a low-freezing, non-complex-forming solvent which polymer is thereafter cured by reaction with sulfur, comprising the steps in combination of heating the cured polymer to a temperature within the range of 100° C. to 200° C. in the presence of a tertiary aliphatic mercaptan comprising tertiary octyl mercaptan, compounding the milled polymer with a further portion of sulfur and thereafter heating the recompounded polymer to curing temperature.

12. The process for reclaiming a polymer prepared by catalytically polymerizing isobutylene and butadiene at a polymerizing temperature within the range between —40° C. and —164° C. by the application thereto of a Friedel-Crafts catalyst and which polymer is thereafter cured by reaction with sulfur, comprising the steps in combination of heating the cured polymer to a temperature within the range of 100° C. to 200° C. in the presence of a tertiary aliphatic mercaptan comprising tertiary octyl mercaptan, compounding the milled polymer with a further portion of sulfur and thereafter heating the recompounded polymer to curing temperature.

13. The process for reclaiming a polymer prepared by catalytically polymerizing isobutylene and dimethyl butadiene at a polymerizing temperature within the range between —40° C. and —164° C. by the application thereto of a Friedel-Crafts catalyst and which polymer is thereafter cured by reaction with sulfur, comprising the steps in combination of heating the cured polymer to a temperature within the range of 100° C. to 200° C. in the presence of a tertiary aliphatic mercaptan comprising tertiary octyl mercaptan, compounding the milled polymer with a further portion of sulfur and thereafter heating the recompounded polymer to curing temperature.

14. The process for reclaiming a sulfur-cured rubbery isoolefin-diolefin interpolymer produced at a temperature below —40° C., comprising the steps of heating the polymer to a temperature within the range of 100° C. and 200° C. in the presence of a tertiary aliphatic mercaptan.

LAWRENCE T. EBY.

REFERENCES CITED

The following references are of record in the file of this patent:

UNITED STATES PATENTS

| Number | Name | Date |
| --- | --- | --- |
| 2,234,204 | Starkweather | Mar. 11, 1941 |
| 2,325,983 | Sarbach | Aug. 3, 1943 |
| 2,334,582 | Read | Nov. 16, 1943 |
| 2,356,128 | Thomas | Aug. 22, 1944 |